US00RE35344E

United States Patent [19]

Fry et al.

[11] E Patent Number: Re. 35,344

[45] Reissued Date of Patent: Oct. 1, 1996

[54] PANEL MOUNTABLE ELECTRICAL CONNECTOR

[75] Inventors: Rupert J. Fry, Des Plaines; John S. Luthy, Naperville, both of Ill.

[73] Assignee: Molex Incorporated, Lisle, Ill.

[21] Appl. No.: 411,112

[22] Filed: Mar. 27, 1995

Related U.S. Patent Documents

Reissue of:

[64] Patent No.: 5,238,427
Issued: Aug. 24, 1993
Appl. No.: 939,891
Filed: Sep. 1, 1992

[51] Int. Cl.[6] ..... H01R 13/74

[52] U.S. Cl. ..... 439/557; 248/27.3; 248/231.9

[58] Field of Search ..... 439/557, 558, 439/567, 554; 248/27.3, 224.4, 231.8, 231.9, 500, 510

[56] References Cited

U.S. PATENT DOCUMENTS

D. 314,942 2/1991 Sato et al. ..... D13/147
3,213,189 10/1965 Mitchell et al. ..... 439/557
4,235,502 11/1980 Marks et al. ..... 439/557
4,681,389 7/1987 Nakazawa et al. ..... 439/467

FOREIGN PATENT DOCUMENTS 262817 1/1977 Germany ..... 439/557
2142080 10/1987 United Kingdom .

OTHER PUBLICATIONS

IBM Technical Disclosure Bulletin Vo. 28 No. 11 Apr. 1986 Title: Panel and Card Mounting Adapter for Universal Palar Conn.

*Primary Examiner*—Gary F. Paumen
*Attorney, Agent, or Firm*—Stephen Z. Weiss

[57] ABSTRACT

An electrical connector is provided for mounting in an opening m a panel or the like and includes a housing having a body portion positionable in the opening in the panel. A separate mounting device, independent of the connector housing, is positionable in a receptacle in the housing. The mounting device includes a panel projecting from the body portion of the housing for abutting one side of the panel at the opening. The mounting device further includes a flexible locking arm projecting from the body portion of the housing for passing through the opening when the body portion of the housing is positioned thereinto and for engaging an opposite side of the panel at the opening.

6 Claims, 2 Drawing Sheets

PANEL MOUNTABLE ELECTRICAL CONNECTOR

Matter enclosed in heavy brackets [ ] appears in the original patent but forms no part of this reissue specification; matter printed in italics indicates the additions made by reissue.

FIELD OF THE INVENTION

This invention generally relates to the art of electrical connectors and, particularly, to an electrical connector which is mountable in a panel or the like.

BACKGROUND OF THE INVENTION

Panel mounted electrical connectors are known wherein a first connector is mounted in an opening in a panel, or the like, for mating with a complementary connector, through the panel. The panel mounted connector can be either a receptacle connector or a plug connector. Such connectors usually include some form of latch means which are operative with or against the edge of the opening in the panel and latchable against a surface of the panel, opposite the direction of insertion of the connector into the opening, to secure the connector within the opening.

Heretofore, most panel mounted connectors have unitarily molded dielectric housings, and the latch means are integrally molded with the housing. Such integrally molded latch means create various problems, including the addition of substantial cost in unitarily molding the housing with the integral latch means. In addition, many plug and receptacle connectors which are designed for mounting in a panel also are used for "free hanging" applications, and a user or technician simply breaks or cuts off the unnecessary latch means which is a considerable waste. Attempts have been made to provide separable latch means on the connector, but such prior attempts usually involved separate clips which simply abut one side of a panel, and the clips, in and of themselves, do not provide a total means for securing the connector in an opening in a panel.

This invention is directed to solving these problems and providing a panel mountable connector which has a separate mounting means independent of the connector housing, the mounting means providing for total mounting of the connector in a panel.

SUMMARY OF THE INVENTION

An object, therefore, of the invention is to provide a new and improved electrical connector of the character described for mounting in an opening in a panel, or the like, and including a separate mounting device independent of the connector housing and which may be used, as desired.

In the exemplary embodiment of the invention, the connector housing includes a body portion positionable in the opening in the panel. The separate mounting device is selectively positionable in receptacle means in the housing. The mounting device includes a panel stop projecting from the body portion of the housing for abutting one side of the panel at the opening, and a flexible locking arm projecting from the body portion of the housing for passing through the opening when the housing is positioned thereinto and for engaging an opposite side of the panel at the opening.

As disclosed hereto, two such mounting devices are provided independent of the connector housing, one at each end of the connector. The receptacle means in the housing is provided by a pair of slots near opposite ends of the housing A pair of the separate mounting devices are respectively positionable in the pair of slots. Each slot has a given width defined by a pair of opposing sides. Each mounting device includes a pair of resilient latch arms insertable into the slots against the opposing sides of the slots. The latch arms are of lengths to extend past the slots and include latch hook portions for snapping behind an exiting face of the housing.

Another feature of the invention is the provision of surface means on the flexible locking arm for engaging the panel at an edge of the opening, the surface means having a stepped configuration for accommodating panels of different thicknesses at the opening.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 2:
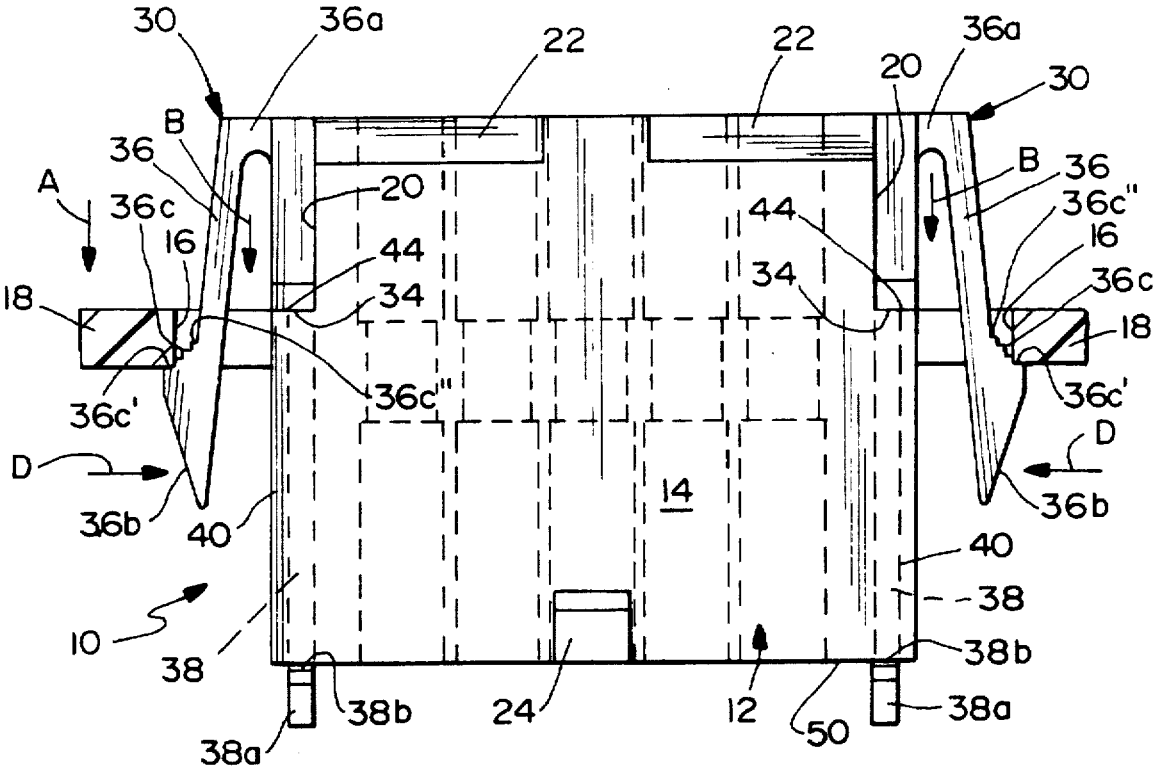
FIG. 2 is a side elevational view of an electrical connector, including a pair of the mounting devices at opposite ends of the connector housing.
Figure 4:
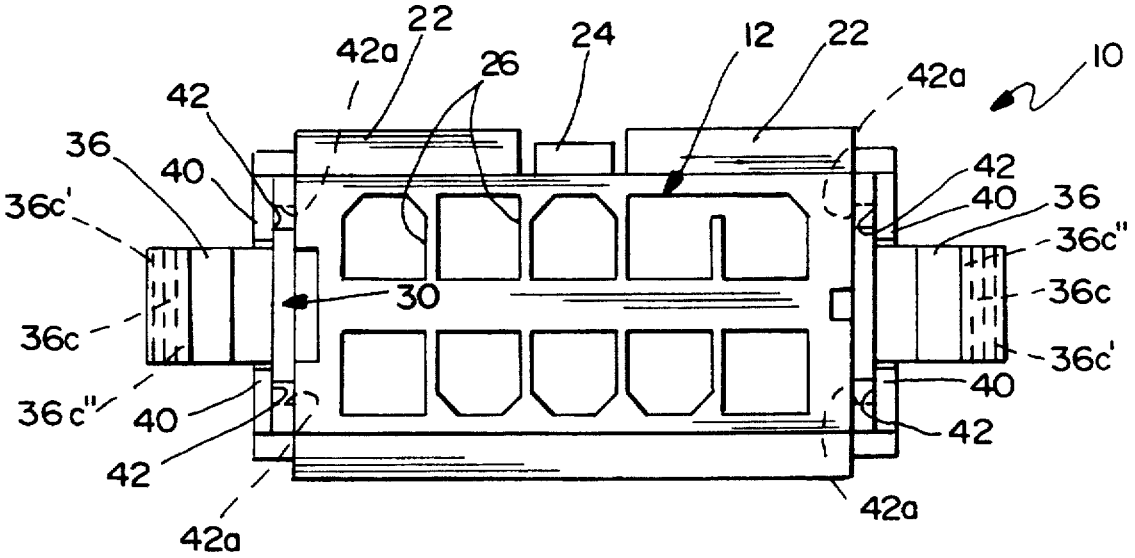
FIG. 4 is a bottom plan view of the connector.

Referring to the drawings in greater detail, the invention is incorporated in an electrical connector, generally designated 10, which includes a unitarily molded dielectric housing, generally designated 12, having a body portion 14 positionable in an opening 16 in a panel 18, in the direction of arrow "A" (FIG. 2). The body portion has opposite ends 20, and a pair of finger gripping flanges 22 project outwardly from opposite sides of the housing for facilitating manual manipulation of the connector. A chamfered latch boss 24 projects outwardly from one side of the connector and is provided for latching to a complementary mating connector (not shown). Although not forming part of the invention, as seen in FIG. 4, the connector includes a plurality of sockets 26 for receiving plugs or terminal-mounting silos of the mating connector. Appropriate terminals (not shown) are mounted in housing 12 of the connector for mating with the terminals of the mating connector.

Referring specifically to FIG. I, the invention contemplates the provision of at least one (two being employed in the preferred embodiment) mounting device, generally designated 30, which includes a generally flat base portion 32 from which all of the other components of the mounting device project. Each mounting device is unitarily molded of dielectric material such as plastic or the like. The base portion defines stop shoulders or surfaces 34 on opposite edges thereof for abutting one side of panel 18, as described in greater detail hereinafter. Each mounting device 30 also includes a flexible locking arm 36 integrally molded with and projecting at a proximal end 36a outwardly from base portion 32, the locking arm terminating in a chamfered or inclined surface 36b at its distal end. A notched surface 36c of the locking arm projects outwardly therefrom, the surface having a stepped configuration, again for purposes to be described hereinafter. Lastly, each mounting device 30 includes a pair of resilient latch arms 38 for securing the respective mounting device in connector housing 12, each latch arm having a chamfered lead surface 38a and a hook portion 38b.

Figure 1:
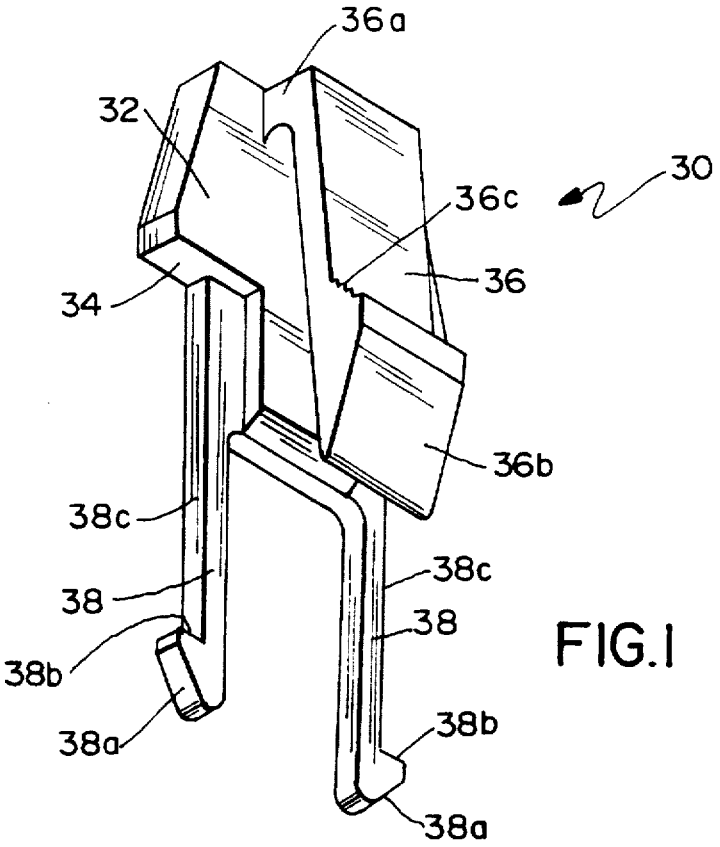
FIG. 1 is a perspective view of the separate mounting device of the invention.
Figure 3:
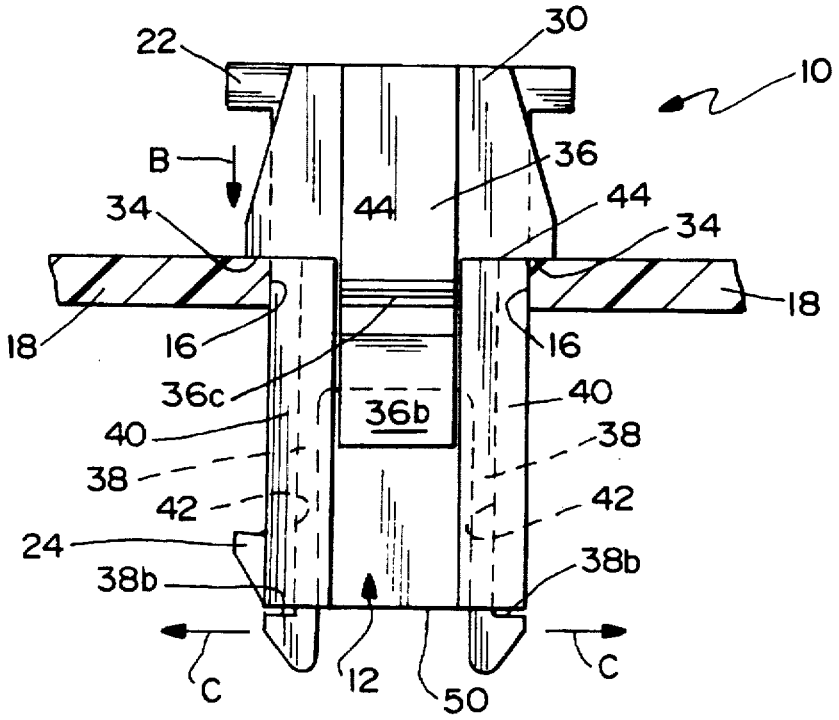
FIG. 3 is an end elevational view of the electrical connector of FIG. 2, looking toward the right-hand end thereof.

Generally, connector housing 12 is provided with receptacle means at each end 20 (FIG. 2) thereof and into which a pair of the mounting devices 30 are insertable as shown best in FIG. 2. More particularly, a pair of ribs 40 are molded integrally with housing 12 and extend along the housing in the insertion direction of the housing as best seen in FIG. 3. The ribs are spaced apart a distance sufficient to accommodate the locking arms 36 of one of the latch devices 30. Ribs 40 define slots 42 therebehind as best seen in FIG. 4. The tops of the ribs define shoulders 44 as best in FIGS. 2 and 3. Slots 42 define a slot means of a given width, as defined by opposite sides 42a (FIG. 4) of the slot means. Latch arms 38 of each mounting device 30 are spaced so that oppositely facing sides 38c (FIG. I) thereof are engageable with opposing sides 42a of slots 42 in the connector housing.

When it is desired to use electrical connector 10 as a panel mountable connector, a pair of mounting devices 30 are assembled to connector housing 12 in the direction of arrows "B" (FIGS. 2 and 3). Locking arms 38 of each mounting device is inserted into slots 42 of the connector housing behind ribs 40. The chamfered distal ends 38a of the locking arms engage opposing sides 42a of the respective slot and the locking arms are biased inwardly against their own resiliency. Each mounting device is inserted in the direction of arrows "B" until stops 34 engage shoulders 44 of ribs 40 as shown best in FIG. 3. This defines the fully inserted position of the mounting device. When the device reaches that position, as seen in FIG. 3, resilient latch arms 38 snap outwardly in the direction of arrows "C" whereby hook portions 38b latch behind an exiting face 50 of connector housing 12, i.e. at the outer ends of ribs 40.

Electrical connector 10, including mounting devices 30 assembled thereto, now is ready to be positioned through opening 16 in panel 18 in the direction of arrow "A" (FIG. 2). Specifically, body portion 14 of the connector housing is inserted into the opening until stops 34 of each mounting device 30 abut against the insertion side of the panel at opening 16, as best seen in FIG. 3. It can be seen that stops 34 project outwardly of the body portion of the connector housing for engaging the panel surface.

During insertion, flexible locking arms 36 of mounting devices 30 are biased inwardly in the direction of arrows "D" (FIG. 2) by engagement of chamfered distal ends 36b with the edges of the opening in the panel. This can be accomplished by a user simply pinching inwardly at opposite ends of the connector against the locking arms in the direction of arrows "D". It should be noted that the depths of slots 42 between ribs 40 at the ends of the connector housing may be sufficient for the entire configurations of the locking arms to move completely within the slots, including the stepped portions 36c of the locking arms. In this manner, the outside surfaces of ribs 40 can tightly engage the edges of the panel opening to eliminate any play between the connector housing and the panel. Of course, a notch must be provided in the panel opening to accommodate latch boss 24 projecting from the connector housing, the boss being described above as being provided for latching with a complementary mating connector.

On the other hand, mounting devices 30 can accommodate different sizes of openings, as shown in FIG. 2, and the mounting devices are provided with a feature to accommodate different thicknesses of panels. Specifically, as described above, a surface 36c on the outside locking arm 36 is provided with a stepped configuration. As seen in FIG. 2, panel 18 is of a maximum thickness and is engaged within one extreme step 36c' of the stepped surface. It also can be seen that opening 16 is considerably wider than the connector housing. Surface 36 is provided with four discrete steps leading to a step 36c" which would accommodate a considerably thinner panel 18 than that shown in the drawings. Opening 16 also could be considerably narrower as can be understood by the distance that locking arms 36 project outwardly in the depiction of FIG. 2. The arms can flex considerably toward the connector housing from the positions shown and still mount the connector within smaller openings other than that shown.

Lastly, with mounting devices 30 being completely separate from or independent of the electrical connector and its housing, it can be understood that if a user or technician desires to use electrical connector 10 in a "free hanging" application, he simply does not employ the mounting devices, saving considerable expense, and he does not have to break or cut off any cumbersome projections as heretofore was done with prior panel mountable connectors having integral or unitarily molded latch means.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

[1. In an electrical connector for mounting in an opening in a panel or the like and including a housing having a body portion positionable in the opening in the panel, wherein the improvement comprises a separate mounting device independent of the housing and positionable in receptacle means in the housing, the mounting device including a panel stop projecting from said body portion of the housing for abutting one side of the panel at the opening and a flexible locking arm projecting from said body portion of the housing for passing through the opening when the body portion is positioned thereinto and for engaging an opposite side of the panel at the opening.]

[2. In an electrical connector as set forth in claim whereto said receptacle means comprise through slot means in the housing into which the mounting device is inserted, with the panel stop and the flexible locking arm projecting outwardly of the slot means.]

[3. In an electrical connector as set forth in claim 2, wherein said mounting device includes a resilient latch arm insertable into the slot means for securing the mounting device on the housing.]

4. In an electrical connector as set forth in claim 3, wherein said resilient latch arm is of a length to extend past the slot means and includes a latch hook portion for snapping behind an exiting face of the housing.

5. In an electrical connector as set forth in claim 3, wherein said slot means is of a given width defined by a pair of opposing sides, and including a pair of said resilient latch arms insertable into the slot means against the opposing sides of the slot means.

6. In an electrical connector as set forth in claim 5, wherein said resilient latch arms are of lengths to extend past the slot means and include respective latch hook portions for snapping behind an exiting face of the housing.

7. In an electrical connector as set forth in claim [1] *9*, wherein said flexible locking arm has surface means for engaging the panel at an edge of the opening, the surface means having a stepped configuration for accommodating panels of different thicknesses at the opening.

8. In an electrical connector as set forth in claim [1] *9*, wherein said housing has a pair of said receptacle means near opposite sides thereof, and including a pair of said separate mounting devices respectively positionable in the pair of receptacle means.

*9. In an electrical connector for mounting in an opening in a panel and including a housing having a body portion positionable in the opening in the panel, wherein the improvement comprises a separate mounting device independent of the housing and positionable in receptacle means in the housing, the receptacle means comprising through slot means in the housing into which the mounting device is inserted, the mounting device having a resilient latch arm insertable into the slot means for securing the mounting device on the housing, the mounting device including a panel stop projecting from said body portion of the housing and projecting outwardly of the slot means for abutting one side of the panel at the opening, and a flexible locking arm projecting from said body portion of the housing and projecting outwardly of the slot means for passing through the opening when the body portion is positioned thereinto and for engaging an opposite side of the panel at the opening.*

* * * * *